May 1, 1934.   W. T. BIRCH   1,956,821
RELIEF VALVE
Filed Nov. 1, 1932
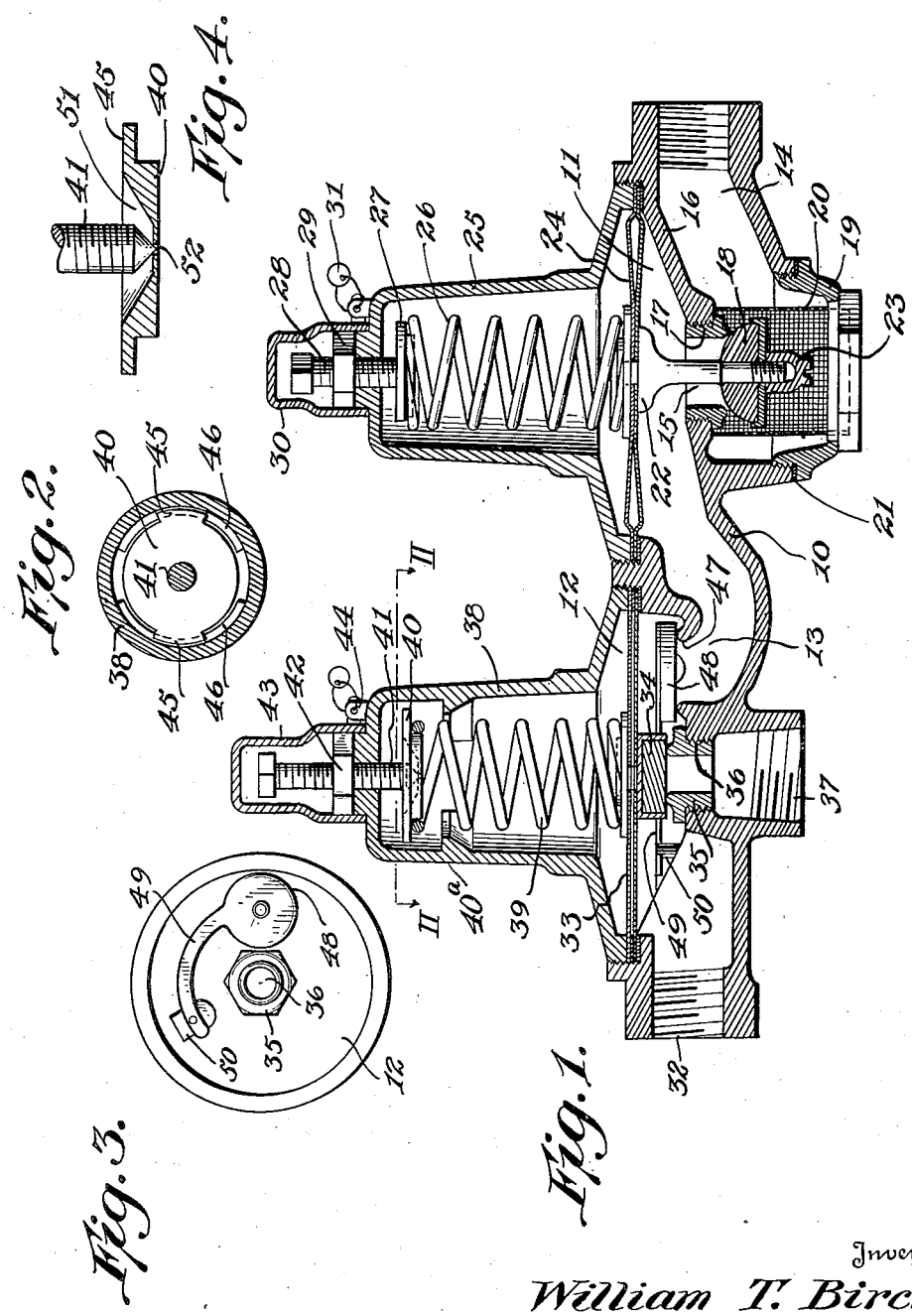
Inventor
William T. Birch
By Charles W. Hills
Attorneys Patented May 1, 1934

1,956,821

UNITED STATES PATENT OFFICE 1,956,821

RELIEF VALVE

William T. Birch, Chicago, Ill.

Application November 1, 1932, Serial No. 640,685

6 Claims. (Cl. 137—53)

The present invention relates to fluid pressure regulators and more particularly to relief valves, such as are used in conjunction with pressure regulators in closed hot water heating systems. By the use of such regulators and relief valves a constant pressure is maintained in the system below that of the supply pressure, the relief valves opening the outlet pressure to the atmosphere whenever expansion of the water, due to high temperature in the system, increases pressure therein above the safety or set point. After the water in the system cools so that the pressure falls below the set point, the main or regulator valves permits the inflow of supply pressure so as to raise the pressure in the system to the set point.

It is customary to provide means whereby the relief valve may be adjusted to open at a pressure determined by the condition of the equipment of the heating system, and the desired operating temperature. Such adjusting means are, unfortunately, usually accessible to persons who may adjust the valve to obtain a desired operating temperature without regard to the condition of the heating equipment, and failures of the equipment, with great injury to persons and to property, have heretofore been all too frequent.

It is an object of the present invention to provide means whereby the valve may be adjusted within safe operating limits.

It is a further and important object of the present invention to provide means whereby any attempt to adjust the valve for other than a safe operating pressure is thwarted.

It is an object of the present invention, therefore, to permit a reasonable adjustment of the relief valve to meet temperature requirements with changing climatic conditions, but to positively prevent an adjustment which may occasion a hazard to persons or to property.

The present application is a continuation, in part, of my application entitled "Regulator and relief valve", Serial No. 528,554, filed April 8, 1931.

In the accompanying drawing, illustrating the invention and forming a part of this specification:

Figure 1 is a central vertical longitudinal section through the complete unit.

Figure 2 is a detail horizontal section taken on line II—II of Figure 1.

Figure 3 is a detail top plan view of the outlet chamber with the head and diaphragm removed to show the check valve member.

Figure 4 is a detail, with a part in section and a part broken in elevation, of a deformable safety adjusting disk.

Referring particularly to Figure 1, the regulator unit has a casing generally indicated at 10. This casing has in line two upwardly opening chambers, a low pressure chamber 11 and an outlet pressure chamber 12. These chambers are in communication with one another through a connecting channel 13 which it will be noted is of an area and shape to reduce friction and furnish an ample waterway.

At one end, the casing 10 has an inlet 14 into which a water service pipe is connected in use, such service pipe being provided with a cut-off valve so that the inlet pressure may be cut off when it becomes necessary to clean or replace any portions of the regulator.

The inlet 14 communicates with the low pressure chamber 11 through a vertical port 15 in the web 16 between the chamber and said inlet. In this port 15 centrally of the base of the chamber 11, a valve seat member 17 is threaded so as to be removable from below and normally present a downwardly directed valve seat for engagement by the regulating valve.

In vertical alinement with the port 15, the base of the casing 10 has an enlarged opening normally closed by a screw cap 19 adapted to normally support the lower end of a cylindrical screen 20. The casing 10 and cap 19 have engaging shouldered portions at 21 so that by means of a suitable gasket between the portions a water-tight joint is assured. When the cap 19 is in position, as shown in Figure 1, the upper end of the screen 20 abuts the web 16 around the port 15 and thus the screen is effective under working conditions to filter such water as passes from the inlet 14 into the low pressure chamber 11.

The regulating valve 18 reciprocates vertically within the screen 20 and is secured around the lower end of a valve post or stem 22 by means of a lower nut 23 which is readily accessible when the cap 19 and screen 20 are removed, and may be renewed or adjusted without affecting the adjustment of the valve actuating means.

The valve post or stem 22 upstands through the port 15 and is rigidly secured at its upper end centrally of the regulator diaphragm 24 which forms the top of the low pressure chamber 11. The diaphragm 24 is preferably made of two pieces of sheet metal as shown so as to assure operation in the event of failure of one piece. The peripheral edge of this diaphragm is seated in connection with a suitable sealing gasket on an annular ledge of the casing and clamped securely in place by the threaded lower flared end of an upstanding hood 25. Each piece of metal is dished, as shown, and the two pieces are clamped together at their center to the stem 22.

The hood 25 houses the regulating spring 26 whose lower end engages the upper surface of the diaphragm at its center and upon whose upper end a plate 27 is seated. This plate in turn is engaged by the lower end of a regulating screw 28 mounted vertically through the upper end of the hood 25. The outer portion of screw 28 is engaged by a lock nut 29 and, with this nut, is covered by a cap 30 which protects the same and may, by a seal 31, prevent unwarranted tampering.

At the other end of the casing 10, an outlet 32, connected in practice with the hot water system, opens directly into the outlet pressure chamber 12 whose top is formed by a double diaphragm 33. Centrally of the lower face of this diaphragm a valve 34 is fixed to normally engage the upwardly directed seat of a valve seat member 35.

The seat member 35 is threaded in a port 36 in the casing base centrally of the base of the chamber 12 and in communication with an internally threaded relief pipe connection 37 from which a suitable relief pipe may lead to any desired point of disposal. Such pipe is, of course, open to the atmosphere.

The diaphragm 33 is clamped in connection with a suitable gasket to an annular shouldered seat of the casing around the upper portion of chamber 12, by the lower threaded and flared end of a hood 38. This hood houses a relief spring 39 whose lower end engages the diaphragm to normally hold the valve 34 seated. The upper end of the spring is engaged by a plate 40 and this plate is, in turn, engaged by the inner lower end of an adjusting screw 41 threaded through the top of the hood 38. A stop 40ª limits the movement of the plate 40 and consequently limits the compression of the spring 39 and thus the pressure in the heating system is limited. A lock nut 42 on the exterior portion of the screw 41 serves to hold the same in adjusted position, and a cap 43 covers and protects the screw and nut. This cap may be secured by a seal 44.

It will be noted that the plate 40 engaging the relief valve spring 39 has diametrically outstanding wings 45, as best seen in Figure 2. It will also be seen in Figure 1 that the hood 38 has arcuate internal shoulders 46, the spaces between which permit of passage of the plate wings 45 upwardly past the shoulders. When turned through 90°, however, the movement of the plate 40 is limited in a downward direction by the shoulders 46 and these shoulders are so placed in the hood 38 that increase of pressure on the valve 34 is limited as the parts appear in Figure 1 to approximately thirty-five pounds.

Thus under normal conditions of installation, the relief valve 34 must open at some set pressure not greater than approximately thirty-five pounds to which the adjustment of its controlling spring is, by the above means, limited.

When the valve is being adjusted by a skilled and responsible mechanic it is a simple matter to determine when the wings of the plate 40 engage the limit stops, and thereby determine the extent to which the adjusting screw 41 should be turned to properly condition the spring 39 for safe operation of the heating system.

It is well known that inexperienced persons have, in the past, tampered with adjusted relief valves to obtain an unduly high operating temperature, and that such tampering has frequently resulted in failure of some part of the heating system with fatal injury to the tamperer, or to some innocent person. It is conceivable that an inexperienced person may willfully attempt to raise the pressure of the system by applying an excessive turning effort to the screw 41 to shear the wings 45 engaging the limit stops, and to thwart such an attempt the central section of the plate 40 has been reduced, as at 51, to ensure deformation or tearing away of the metal of the central section 51 when the plate is subjected to an excessive pressure by the screw 41. It will be obvious that any attempt to force the plate 40 past the limit stops will result in the screw passing through the plate, and in a sudden reduction of resistance to movement of the screw to warn the tamperer that his efforts have been in vain.

The condition of the plate will be evidence of an unauthorized attempt to produce an operating hazard.

To facilitate rupturing of the plate 40 under excessive pressure, the central section may be provided with a small perforation 52, and the end of the screw 41 may be suitably shaped, as shown in Figure 4.

While I have shown my preferred embodiment of means which normally cooperate to effect compression of the compression spring to a safe value, and which automatically are disconnected from this spring-compressing relation when an attempt is made to apply an excessive pressure to the spring, it will be evident that equivalent means may be employed, within the spirit of my invention, which are normally cooperable for compression of the spring to a safe value and which automatically become ineffective as spring-compressing means when an attempt is made to apply an excessive pressure to the spring.

At the end of the connecting channel 13 between the chambers 11 and 12, an upwardly presented valve seat 47 is formed within the chamber 12. On this seat a check valve 48 is adapted to seat and check outflow of fluid from the heating system. This check valve is thus located between the relief valve 34 and the main regulating valve 18 and its action is in a sense independent of the action of both the relief and regulating valves as we shall see.

The check valve 48 is secured to one end of a flat spring arm 49 which, as seen in Figure 3, is curved to clear the relief valve and is anchored at its opposite end to a boss 50 upstanding from the base of the outlet chamber 12.

Thus, if for any reason pressure in the supply connections to the regulator falls below the set pressure in the heating system to which the outlet 32 is connected, the check valve 48 will automatically seat itself and prevent backflow of fluid from the system. This is true in case of failure of pressure in the supply connections as well as when pressure is cut off therein preparatory to removing the regulator valve 18 for adjustment, cleaning or substitution of parts.

Under normal circumstances, with the controlling springs 26 and 39, properly set, water is admitted into the heating system through the regulator, by opening the usual cut-off valve in the supply connections. Water continues to flow into the system until sufficient pressure, usually ten to fifteen pounds, builds up therein whereupon this pressure acting against the lower face of the diaphragm 24 overcomes the pressure of spring 26 and closes the regulating valve 18. No more water will then enter the system until such time as the relief valve 34 has opened, due to increase in pressure in the system by the expansion of the highly heated water. When such excess expansion pressure has been relieved by exhaustion of water through the relief valve, and the system again cools off, if pressure therein is below the set pressure of the regulating valve, the latter will again open to admit a further supply of water into the system.

I am aware that numerous details of construction may be varied through a wide range without department from the principles of this invention, and I therefore do not purpose limiting the patent granted otherwise than necessitated by the prior art.

I claim as my invention:

1. In a pressure regulator for closed heating systems, a casing having an outlet for connection to a system and having a chamber in open communication with said outlet, said casing having a port leading from the atmosphere to said chamber, a valve within the chamber normally seated to close said port, a diaphragm to which said valve is connected, a spring bearing at one end upon said diaphragm, a hood around the spring, a plate on the other end of the spring, an adjusting screw in connection with said plate to regulate tension of the spring, shoulders formed within the hood and spaced apart, and wings on said plate normally arranged to engage the shoulders to limit pressure adjustment of the spring, the wings in another position of the plate being movable through the spaces between the shoulders as described.

2. A pressure relief valve, comprising a diaphragm, a valve operably connected with said diaphragm, compression spring means in compressing engagement with said diaphragm, a member manually operable to compress said spring, and means yieldable to limit spring-compressing effectiveness of said manually operable member when an excessive pressure is applied to said yieldable means and normally cooperable with said member for compression of said spring.

3. In a pressure relief valve having a compression spring and a valve operably connected with said spring, manually adjustable means to compress said spring, said means comprising a movable member, and a second member normally cooperable therewith for compression of said spring and yieldable to limit spring-compressing effectiveness of said manually adjustable means when an excessive pressure is applied to said second member.

4. In a pressure relief valve having a compression spring, and a valve operably connected therewith, means movable to compress said spring, said means including a member normally cooperable therewith to compress said spring and being yieldable to limit spring-compressing effectiveness of said spring-compressing means when an excessive pressure is applied to said yieldable member.

5. In a relief valve having a compression spring and a valve cooperably connected therewith, means movable to compress said spring, means to normally limit movement of said spring-compressing means, said spring-compressing means including a member normally cooperable therewith to compress said spring and yieldable to limit spring-compressing effectiveness of said spring-compressing means when an excessive pressure is applied to said yieldable member.

6. In a relief valve having a compression spring and a valve cooperably connected therewith, a member engaging said spring, another member movable to push said first member, means to limit movement of said first member, said first member being normally cooperable with said second member to compress said spring and being deformable to limit spring-compressing effectiveness of said first and second members when an excessive pressure is applied to said first member.

WILLIAM T. BIRCH.